United States Patent [19]

Rees

[11] Patent Number: 4,638,422
[45] Date of Patent: Jan. 20, 1987

[54] DATA ENTRY INTERFACE ASSEMBLY

[76] Inventor: Elwyn Rees, Maesydd, Llangan, United Kingdom

[21] Appl. No.: 611,981

[22] Filed: May 18, 1984

[30] Foreign Application Priority Data

May 19, 1983 [GB] United Kingdom ............... 8313919

[51] Int. Cl.⁴ ............................................. G06F 3/00
[52] U.S. Cl. ................................................... 364/200
[58] Field of Search .................... 364/200 MS File

[56] References Cited

U.S. PATENT DOCUMENTS 4,407,016  9/1983  Bayliss et al. ...................... 364/200

FOREIGN PATENT DOCUMENTS 1412785  11/1975  United Kingdom ................ 364/200
1579641  11/1980  United Kingdom ................ 364/200

Primary Examiner—Raulfe B. Zache
Attorney, Agent, or Firm—Saidman, Sterne, Kessler & Goldstein

[57] ABSTRACT

An interface assembly enables a number of remote data entry terminals to transmit information to a computer. The interface assembly 30 comprises a memory buffer 42 comprising one byte of memory for each terminal 32. The terminals 32 are hard-wired to individual memory addresses, so that each byte of the memory is driven to the value dictated by the user's last input at its respective terminal. An address generator 44 repeatedly scans the memory buffer 42, transmits to an interface 50, 52 or 54 information identifying the address and the byte value held at that address and resets the address to a null value. In this way the input information is transmitted byte by byte to the CPU through the same interface which is chosen for its handshake compatibility with the CPU. If desired plural interfaces may be provided in the assembly, so that the CPU may simply be plugged into that one which is compatible.

7 Claims, 3 Drawing Figures

DATA ENTRY INTERFACE ASSEMBLY

This invention relates to data entry for computers and microprocessor-controlled devices having a plurality of data entry sources, and provides an interface assembly for such data entry.

There are many situations in which a number of users at remote terminals are expected to input information to a computer, or in which a number of remote transducers send information to a central processing unit. One typical such situation is when a computer is used as a teaching tool. Typically several students, grouped around a single television monitor or VDU (visual display unit), are each provided with their own input device which is a terminal comprising a keyboard, a memory, an address generator and optionally a VDU. When the central VDU displays a question requiring a response from the students, each student keys his response into his terminal. When that response is completed by a key command to enter it to the computer, then the terminal addresses the computer, performs a handshake routine and delivers to the computer information identifying the terminal and information relating to the student's input. This transfer of information from the terminal to the computer may be in conventional serial bit form, in conventional parallel bit form or in any other form (possibly user-defined) compatible with the interface at the computer. However all terminals must use the same interface convention, as all would be transmitting their information, in random order, to the same i/o port of the computer.

Problems associated with this conventional system of multi-user data entry include the queueing time incurred while the computer performs the repeated functions of identifying a terminal whose response is complete, accepting that response and processing that response. The equipment is also costly, as each student's terminal has to include a keyboard, a memory buffer capable of storing the maximum response likely to be input, an address generator for identifying the particular terminal to the computer by means of its own unique address, an encoder for enabling transmission of the information from the memory to be in a form compatible with the computer interface, a VDU for displaying, character by character, the student's input, and a power pack for supporting all the above components. Clearly in a teaching situation the cost of providing terminals for a large number of students can be exhorbitant, and is a major part of the cost of the total equipment.

It has not previously been thought feasible for a CPU to be able to accept, through a single i/o port, information from a number of low-cost, non-intelligent data entry sources which do not employ handshake protocols and do not necessarily all adopt the same (or even any) interface convention. The interface assembly of the invention makes such a configuration possible and provides, for the first time, a major cost reduction in the terminals needed for a multi-user multi-terminal computer configuration.

The invention provides an interface assembly enabling a central processing unit to accept and allocate information from a number of remote data entry terminals. The assembly of the invention comprises an interface to match the interface convention at an i/o port of the central processing unit, a buffer comprising one byte of memory for each of the remote data entry terminals to be served, means for supplying data from those remote data entry terminals to individually assigned bytes of the buffer memory, an address generator for addressing individual bytes of the buffer memory in sequence, means for transferring to the interface information identifying the byte addressed and the value held by that byte, and means for resetting the value of each byte addressed to a null value on such transfer.

To illustrate the use of an interface assembly of the invention, it is postulated that the assembly is linked to an i/o port of a computer which recognizes the standard IEEE (Institute of Electrical and Electronic Engineers) interface convention. It is further postulated that the buffer of the assembly is linked to n keyboards by means of n 8-strand flexible connectors, and that each keyboard generates, at its output, an ASC11 code reflecting a key currently being depressed.

In the above simple illustration the buffer of the interface assembly would comprise n utilized bytes (possibly together with additional memory for further additions of data entry terminals) and the interface would be an IEEE parallel interface. When the VDU of the computer called for any response from the users, each user would key in that response character by character at his own keyboard. As a key depression at each keyboard generated its own matrix code, that code would be transmitted to the appropriate byte of the buffer memory where it would be stored.

A driver circuit, either in the CPU or in the address generator itself, would cause the address generator repeatedly to scan the buffer memory addresses. If any address contains a byte value other than the null value then that value is transferred to the interface together with address information and the byte is restored to its null value. Scanning can be achieved at so rapid a pace that there is virtually no practical possibility of a second key being depressed before the information generated by the first key is transferred to the interface. Queueing time for each user is reduced to a minimum since the user responses are transferred to the CPU as they are generated rather than when the processing of other user-responses is completed. Most important, however, is the marked decrease in the cost of the user terminals which need be no more than simple keyboards. No intelligence is needed at the keyboards to perform handshake functions with the computer, and no memory and power pack is necessary. As postulated above, the keyboard is an alpha-numeric keyboard generating matrix codes. However any other keyboard may be provided, including purely numeric keyboards, custom-made keyboards and even simple ON/OFF switches.

Also the 8-strand connectors providing the hardwired connection between each individual keyboard and its allocated buffer memory byte can be replaced by any other hard-wiring suitable for generating a binary value at the buffer address to reflect the nature of the input. Transmission of that binary value and its address to the computer is effected by the interface assembly irrespective of the value or meaning of that value, and it is the responsiblity of the computer software to process the information in a meaningful manner.

Alternatively, the keyboard may comprise a matrix of lines each of which is loaded with a different resistance such that on the depression of a key a unique combination of resistors is associated with that key, and places a unique load across a pair of connectors leading to the interface assembly. The interface assembly then includes means for interpretting the signals received.

If desired, the individual keyboards could include displays for displaying single characters, partial or complete lines or even complete screens of input information. The use of liquid crystal or LED displays could enable a limited display to be achieved relatively inexpensively. However no change to the interface assembly of the invention would be needed if the keyboard included a display, so that a user would be able to select the user terminals best suited for each individual application and budget.

From the above illustration it will be appreciated that the buffer be based on 8-bit logic, 16-bit logic or any other logic capable of being processed by an associated CPU. The interface, postulated above as being an IEEE parallel interface, may be any parallel, serial or user-defined interface. Indeed one preferred form of the invention contemplates the use of two or more interfaces within the assembly, so that the same assembly can communicate with computers having different handshake conventions. Preferably the assembly includes an IEEE parallel interface, a RS serial interface and a user-definable interface, with the byte values and addresses from the buffer being transferred either simultaneously to all three interfaces or selectively to only one of the interfaces in response to an external switch or in response to commands from the CPU. In the latter case the program would include means for generating command signals to the interface assembly, to ensure that information transmitted from the buffer and address generator was channelled through the relevant compatible interface.

One very promising application for the invention is in teaching, where it will become economically feasible for the first time to provide a large number of student keyboard terminals without making the total cost of the installation prohibitively expensive. In such a teaching situation the equipment may be organized in any of a number of different configurations but typically the teacher would control a master keyboard with its own VDU, and the students' keyboards would be connected to the CPU via the interface assembly of the invention. The individual student's key input could be echoed on VDU monitors at strategic locations around the room, so that each monitor displayed the responses of a number of students simultaneously. The software of such a teaching configuration could enable the teacher selectively to display on the master VDU an analysis of the total student input or a display of the inputs of one or more individual students, at his discretion.

The interface assembly of the invention does not find its sole application in a teaching environment, however. It is useful in any situation in which information is generated at a number of discrete data entry points in a serial fashion (letter-by-letter, number-by-number or, generally byte-by-byte) and has to be input to a single CPU. The interface assembly of the invention, by passing each byte to the buffer and thence to the CPU as it is generated rather than on input completion, enables the invention to be of useful application in warehouse management, where a number of stocktaking data input terminals can inexpensively be provided over a large warehouse area, and product control in industry.

DRAWINGS

Figure 1:
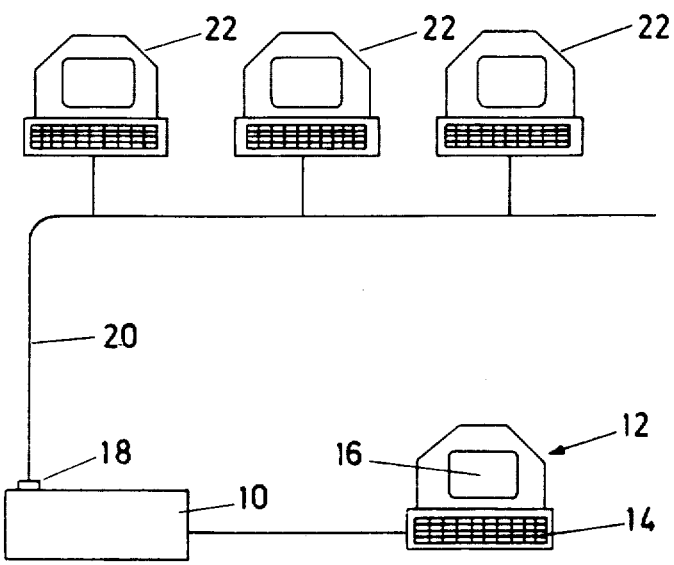
FIG. 1 illustrates a conventional teaching arrangement of CPU and students' terminals.

In the conventional arrangement of FIG. 1 a computer 10 is controlled by its own master terminal 12 which comprises a keyboard 14 and a VDU 16. The CPU of the computer 10 has an i/o port 18 which is connected by the same multi-core cable 20 (generally a flat ribbon cable) to a number of remote terminals 22. Each terminal 22 is an intelligent terminal capable of addressing the CPU with an agreed handshake convention and sending information to or receiving information from the CPU. The handshake convention may be, for example IEEE (parallel), RU (serial) or any user-defined convention, but all the terminals 22 must adhere to the same convention which must be that recognized by the CPU. In addition, each terminal 22 must be capable of identifying itself and must generate its own exclusive code during handshaking with the CPU, so that messages to or from each individual terminal can correctly and unambiguously be identified. To achieve this, the terminals 22 are of necessity intelligent terminals, provided with a memory, an address generator and the necessary power pack to drive such units.

Figure 2:
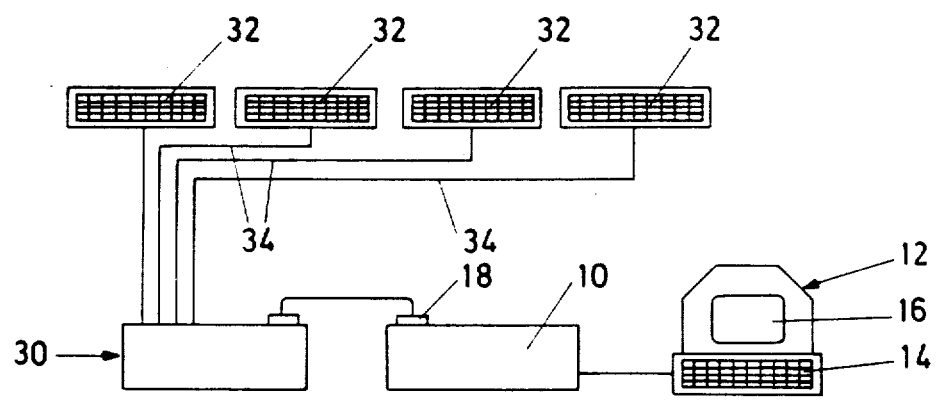
FIG. 2 illustrates a comparative arrangement using an interface assembly according to the invention.

In comparison, the arrangement of FIG. 2 illustrates the savings that can be achieved using an interface assembly according to the invention. In the arrangement of FIG. 2 the same computer 10 and master terminal 12 is used as in FIG. 1, but the i/o port 18 of the CPU is connected to an interface assembly 30 according to the invention. A number of keyboards 32 is wired to the interface assembly 30, each keyboard 32 being hardwired through its own flexible multi-strand cable 34 to the interface assembly to address an individual byte of the interface assembly's buffer.

The keyboards 32 of FIG. 2 do not require any intelligence and may be simple low-cost keyboards devoid of any individual interfaces, address generators, screens or power packs.

Figure 3:
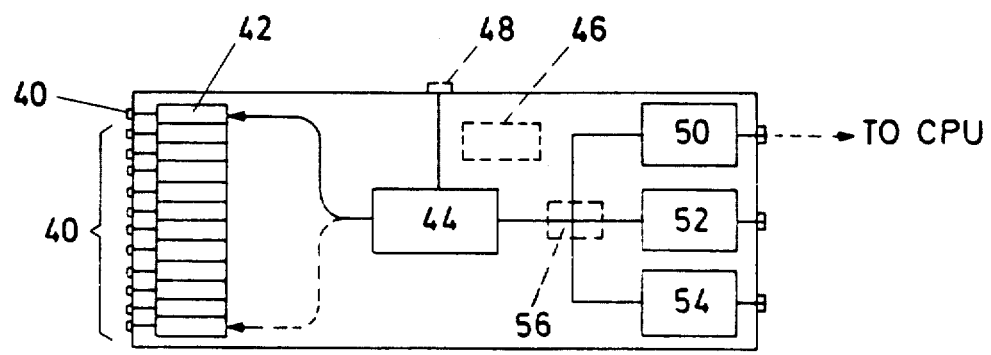
FIG. 3 is a block diagram of an interface assembly according to the invention.

The interface assembly 30 of FIG. 2 is illustrated in greater detail in FIG. 3.

The assembly comprises an array of inlet ports 40, each of which is capable of receiving a logic signal over one of the cables 34 from one of the keyboards 32 of FIG. 2. Each inlet port 40 supplies directly and exclusively its own particular assigned byte of a memory buffer 42. If the memory buffer 42 has 8-bit logic, then each byte is capable of holding any of 256 logic values. If it has 16-bit logic then each byte can hold over 64K values. For most applications 8-bit logic or less will be quite adequate, being sufficient to hold all the ASC11 codes that are generated by conventional keyboards.

An address generator 44, driven by a drive circuit 46 or directly from the CPU via a drive input 48, is arranged to address each byte in turn of the memory buffer 42, to extract the value contained at that address, to transmit that value together with address information to interfaces 50,52 and/or 54, and to reset the byte at the said buffer address to a null value. The transmission of the address and byte value to the interfaces may be simultaneous transmission to all three interfaces or it may be via an interface selector 56. The selector 56 would be capable of switching the information to any selected one of the interfaces, either in response to external switching means on the assembly or in response to the program in the computer 10.

The interfaces 50,52 and 54 may be any commonly accepted interfaces to render the equipment capable of communicating with the majority of computers. For example the interface 50 may be IEEE interface, 52 may be a RU interface and 54 may be a user-definable interface so that the interface assembly is capable of communicating immediately with conventional parallel or serial port computers, or after programming with computers not recognizing the above two conventions.

In use, as the users key information into their keyboards 32, each key depression in turn sets a byte value at the correpsonding buffer address. That byte value is regularly, and extremely rapidly, removed by the address generator, replaced by a null value and transferred to an interface, for example the interface 50. The byte retains its null value until the next key depression, and the scanning of the buffer memory continues until such a new value is recognized.

The interface assembly of the invention can be used with any micro, mini- or mainframe computer but its most significant advantage is thought to be in connection with microcomputers arranged for data entry from a number of remote sources. The greater the number of remote data entry sources the more cost-effective it becomes to make those terminals non-intelligent, coupling them to the computer through the interface assembly of the invention.

What is claimed:

1. An interface assembly enabling a central processing unit to accept and allocate information from a number of remote data entry terminals, which assembly comprises:

an interface to match the interface convention at an i/o port of the central processing unit;

a memory buffer comprising one byte of memory for each of the remote data entry terminals to be served;

means for supplying data from the said remote data entry terminals to individually assigned bytes of the memory buffer;

an address generator for addressing individual bytes of the said memory buffer in sequence;

means for transferring to the said interface information identifying each individual byte address and the value held by the byte at each said address;

and means for resetting the value of each byte addressed to a null value on such transfer.

2. An interface assembly according to claim 1, comprising two or more of the said interfaces having mutually different interface conventions, enabling the assembly to match the interface conventions of different central processing units with which it might be used.

3. An interface assembly according to claim 2, wherein the interfaces comprise one parallel and one serial interface.

4. An interface assembly according to claim 3, wherein three or more interfaces are provided, including one which has a user-definable convention.

5. An interface assembly according to claim 2, 3 or 4, wherein the means for transferring the information supplies the necessary address and byte value information to both or all interfaces simultaneously.

6. An interface assembly according to claim 2, 3, or 4, wherein the means for transferring the information supplies the necessary address and byte value information to an interface selector which transmits the information to a preselected interface chosen for its compatibility with the central processing unit.

7. An interface assembly according to claim 1, wherein the address generator is arranged to be driven in response to an output of the central processing unit.

* * * * *